Patented Sept. 22, 1953

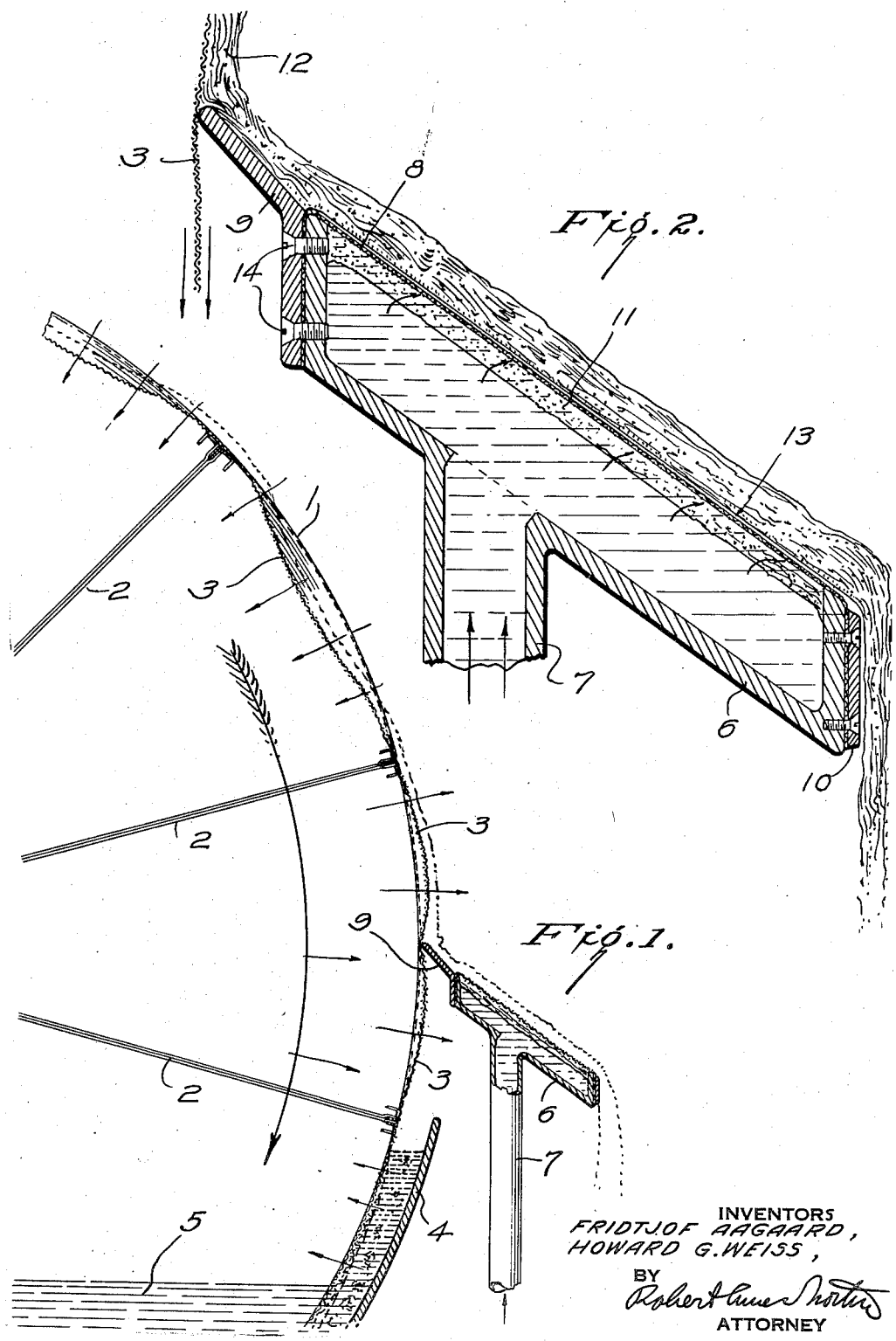

2,652,929

UNITED STATES PATENT OFFICE 2,652,929

DEVICE FOR HANDLING OF WET STICKY PASTES

Fridtjof Aagaard, Rahway, N. J., and Howard G. Weiss, Marietta, Ohio, assignors to American Cyanamid Company, New York, N. Y., a corporation of Maine Application March 20, 1951, Serial No. 216,516

3 Claims. (Cl. 210—201)

This invention relates to an improved take-off blade for continuous filters, such as continuous vacuum filters.

Continuous vacuum filters, such as the so-called Oliver filters have achieved very extensive use. In these filters there is a rotary drum usually with a vacuum connection to its interior which slowly rotates through a suspension to be filtered. The vacuum sucks up a cake which is dewatered as the drum rotates through the air. The take-off blade is provided to remove the filter cake building up on the drum before the latter again dips into the slurry to be filtered. With relatively coherent filter cakes, the take-off problem is not serious, as the cake passes over the blade intact.

In some cases, where there has been difficulty in separating the cake, air or sometimes water has been blown under the cake. This is effective in aiding to remove the cake from the filter drum.

It has also been proposed to provide the surface of the take-off blade with hollow ribs having perforations through which air is blown which serves to loosen the cake from the take-off blade.

When dealing with wet, sticky cakes, none of these procedures give satisfactory results. The air blast in front of the take-off knife is of little use because the sticky cake adheres to the knife and does not pass over it smoothly and drop off. Perforated ribs are useless because a sticky cake has no mechanical strength and adheres in the spaces between the ribs soon clogging the surface and rendering a smooth discharge impossible. For this reason, continuous vacuum filters have not been suitable for the filtration of suspensions forming wet, sticky cakes and it has been necessary to use other types of filters such as filter presses, nutsches and the like, which are more expensive to operate and have a lower output than the continuous types.

The present invention is concerned with an improved take-off knife which can be used with materials which form wet, sticky cakes on continuous filters. The knife is provided with a solid, bevelled cake-removing blade, the rest of the knife being of porous material through which water or other liquid is forced. The porous material may be of any suitable type, for example, it may be a block of porous ceramic material. For practical operation it is found that a filter screen on the back of which a cake of the material to be filtered is preferable. The screen can be easily removed and cleaned when the material to be filtered is changed. The invention, however, is in no sense limited to any particular porous material. The liquid forms a thin, continuous film on the surface of the porous material, supporting the cake as it flows over the knife. Even the stickiest, wettest cakes will not adhere or ball up on the knife and there is thus opened a new field for continuous vacuum filtration of materials for which this extremely efficient type of filter had hitherto been entirely unsuitable.

The pores of the porous material used in the take-off knives of the present invention are so small that no material mechanical strength is required in the cake. At the same time, the flow of liquid through the pores is so gentle that no channelling or breaking through of a wet, sticky cake results, as occurs with perforations such as those which have been used in perforated ribs in the past. While the pore size is very small and the corresponding distance to be bridged by the cake is very short, the exact pore size will differ with different materials and is not critical. In general, the pore size is of the order of 100 microns or less. Finer pore size makes the control of the flow of fluid easier but increases the back pressure. Soon the point is reached where the pore size is so small that even the stickiest cake is uniformly supported. Finer pore sizes may of course be used but the increase in back pressure requires markedly increased fluid pressure without any corresponding gain in efficiency of support of the cake removed. In general, it is preferred to operate with pore sizes large enough to permit reliable operation with the fluid pressure not exceeding 1.0 lb. per square inch.

The problem of support of the porous material must be taken into consideration since back pressure increases with the thickness of the porous material, but it presents no serious engineering problem.

It is generally desirable to use fairly thin porous layers, and in some cases a mechanical support may be necessary. There are available thin microporous alloys such as stainless steel which also have very adequate mechanical strength, where the filter is to be used continuously on material which does not corrode such metals, they may be preferred, but of course, do not have as much flexibility as a screen. The take-off knife blade head itself, of course, must be hollow in order to introduce the fluid under pressure.

It is an advantage of the present invention that the porous surface back of the knife edge itself may be applied to any ordinary design or take-off knife, it being only necessary to replace the solid head with a hollow one. Therefore, the invention is applicable to any ordinary design of continuous mechanical filter without requiring any extensive reconstruction.

It might be supposed that, with a very sticky material, there would be a tendency to build up on the knife blade itself, which, of course, is not porous. Actually, it has been found that this is no problem. The non-porous surface is quite narrow and any thickening or building up which may occur temporarily is smoothed out or carried away by the film of water over the porous surface. At the same time this film is so thin that the amount of water added to the cake is negligible and even with the stickiest of cakes, dewatering to the maximum practical degree can be obtained by means of the present invention.

The invention will be described in greater detail in conjunction with the drawing, in which:

Fig. 1 is a section through part of an Oliver filter, using a take-off knife of the present invention, and Fig. 2 is an enlarged detail view of the take-off knife and head.

The filter drum is shown at 1, provided with the conventional radial compartment walls 2, with screen sections 3. The drum dips into the tank 4, containing the slurry to be filtered 5.

The take-off knife comprises a hollow head 6 and a hollow support 7 through which water or other liquid can flow. A screen 8 extends around the head and is clamped to it at one end of the take-off knife blade 9, using carefully countersunk screws 14 on the back end of the head. The screen is fastened by the clamping plate 10.

Before the filtration starts, a small amount of the solids to be filtered is introduced with water through the hollow support 7 and forms a thin porous cake 11 on the under side of the screen 8. The filter cake 12 is removed from the drum by the blade 9 which is in contact with the screen at a point where the latter is under internal pressure of compressed air. This causes the screen to bulge against the knife and ensures thorough removal of the cake. The variation from vacuum to pressure is standard in continuous vacuum filters and the conventional valve structure is not shown. The cake 12 moves along the take-off knife head on a microscopically thin film of water 13, the thickness of which for purposes of clarity, is enormously exaggerated in the drawing. This thin film lubricates and supports the moving cake and no difficulty is encountered even with the stickiest and wettest material. The amount of water introduced in the cake by the thin film is negligible.

We claim:

1. A take-off knife for a continuous filter comprising in combination a hollow knife head, a knife edge which is detachably mounted thereon, a porous layer substantially covering the upper surface of the head back of the knife edge and means for supplying fluid under pressure to said hollow head, said fluid moving in the direction from the hollow head outwardly through the porous layer, the pores of the porous layer being sufficiently fine so that the fluid flows therethrough to form a very thin continuous fluid film on the surface thereof.

2. A take-off knife according to claim 1 in which the porous layer has a screen fabric clamped to one side of the head by the knife edge and means are provided for clamping the screen to the other edge of the head.

3. A take-off knife according to claim 1 in which the pore sizes are sufficiently small so that the continuous film is formed by applying fluid under pressure to the order of 1 lb. per square inch.

FRIDTJOF AAGAARD.
HOWARD G. WEISS.

References Cited in the file of this patent
UNITED STATES PATENTS

| Number | Name | Date |
|---|---|---|
| 762,437 | Parker | June 14, 1904 |
| 1,914,742 | Hillier | June 20, 1933 |
| 2,070,074 | Young | Feb. 9, 1937 |
| 2,271,385 | Best | Jan. 27, 1942 |